June 5, 1956 — E. H. POTTS — 2,748,578
ADJUSTABLE SHEAR TYPE COUPLING
Filed Jan. 18, 1954
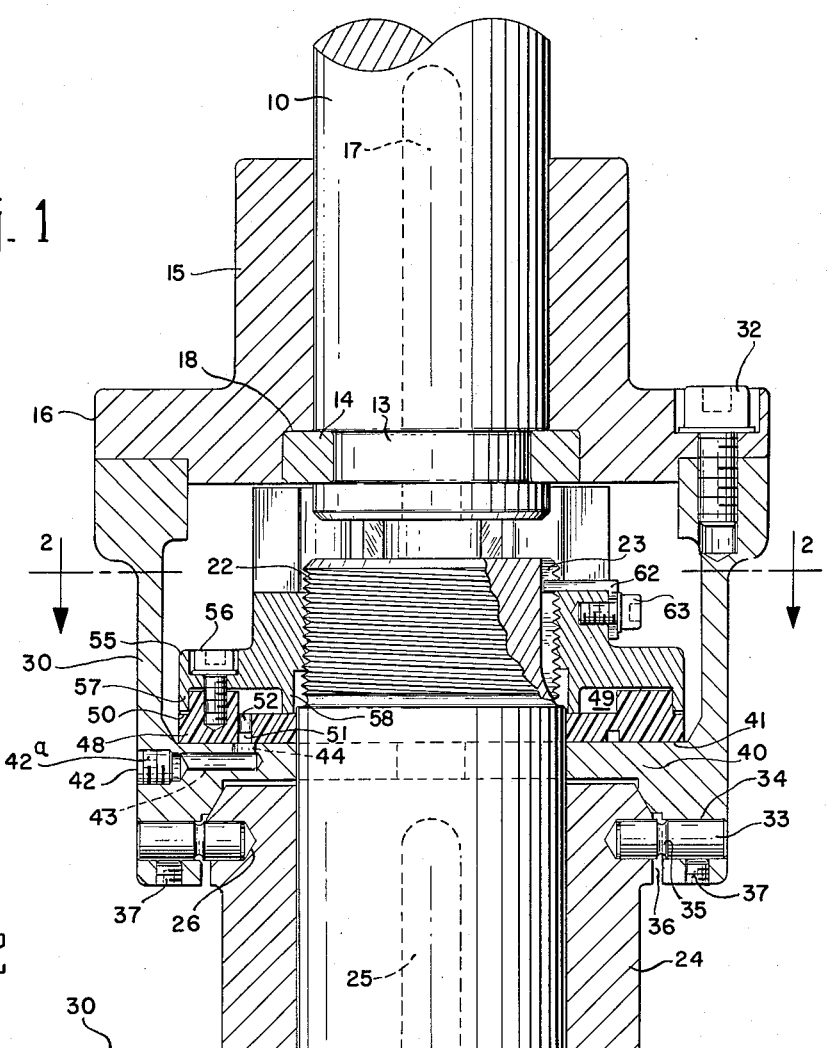
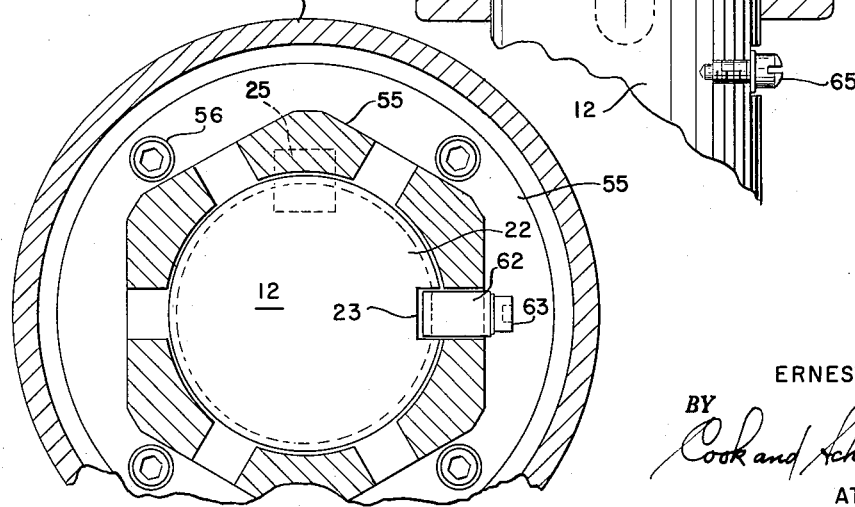
INVENTOR.
ERNEST H. POTTS
BY
Cook and Schermerhorn
ATTORNEYS United States Patent Office 2,748,578
Patented June 5, 1956

2,748,578

ADJUSTABLE SHEAR TYPE COUPLING

Ernest H. Potts, Portland, Oreg., assignor to Guy F. Atkinson Company, South San Francisco, Calif., a corporation of Nevada Application January 18, 1954, Serial No. 404,597

9 Claims. (Cl. 64—28)

This invention relates to improvements in couplings, and more particularly to a safety coupling for establishing severable torque connection between a vertical drive shaft and an axially aligned shaft suspended from the drive shaft.

Conventional shear couplings designed for use on horizontal shafting are generally not suitable for use on vertical shafts, particularly in installations where a lower shaft is suspended from, as well as driven by, an upper length of shaft. In a vertical pump shaft, for example, the weight of a pump impeller and a length of shaft must hang from a coupling connected with an upper driving shaft. In normal operation there is no relative rotation between the two shafts, but in case of an obstruction in the pump stopping the rotation of the impeller and breaking the shear pins in the coupling, the upper shaft continues to rotate while still supporting the stationary lower shaft. This condition may continue for some time until the trouble is discovered and the motor is shut off. Under these circumstances, a conventional coupling, and possibly even the pump itself, would be seriously damaged and would require a replacement of parts other than merely the broken shear pins. Conventional couplings also lack a satisfactory length adjustment by which a pump impeller or other driven member on a vertical shaft may be raised or lowered to its proper operating position. Such vertical adjustment may be necessary, not only in the original installation, but also to compensate for possible wear in the thrust elements of the coupling which may result from continued operation of the driving shaft for a period of time after stoppage of the driven shaft and failure of the shear pins in the coupling.

An important object of the present invention is, therefore, to provide a safety coupling for connecting a pair of vertical shafts in axial alignment and supporting the thrust of the lower shaft without damage or undue wear in the event of relative rotation, to provide for vertical adjustment for one of the shafts relative to the other, to provide overload shear means to permit relative rotation between certain elements of the coupling when an excessive torque load is imposed upon one of the shafts, to provide an enclosed lubricated thrust bearing surface in the coupling to accommodate relative rotation between certain elements for a considerable period of time after failure of the shear means without damage to the coupling, the driving elements or the driven elements, and to provide a safety coupling suitable for a vertical pump shaft which is relatively inexpensive to manufacture and reliable in operation.

The invention comprises a novel coupling for establishing connection between a drive shaft and a driven shaft in axial alignment, and is intended primarily for use with vertical shafting employed in pumping equipment for lifting liquid from a well, tank or vessel. A collar is keyed adjacent each of the shaft ends and a driving connection is accomplished between these collars by means of a cylindrical sleeve, the connection between the sleeve and the driven shaft collar comprising shear pins which are severed when an excessive torque load is imposed upon the driven shaft whereby certain elements of the coupling rotate relative to other elements. The drive shaft is provided with abutment means to lock the collar thereon against vertical thrust, and the sleeve connecting the pair of collars has an inwardly extending flange which supports the weight of the driven shaft. The sleeve has a pipe connection and groove for admitting a lubricant to the interior of the sleeve so that the inner surface of the flange on the sleeve which serves as a thrust bearing surface for the driven shaft will be lubricated. Another feature of the present invention is that the driven shaft has vertical adjustment which is accomplished by an adjustable nut threaded on the driven shaft interiorly of the sleeve and supported by the flange of the sleeve, said nut being castellated and adapted to be locked in a predetermined position of adjustment on the shaft.

The invention will be better understood and additional objects and advantages will become apparent from the following description taken in connection with the accompanying drawings which illustrate a preferred form of the device. It is to be understood, however, that the invention is not limited to use in a pump as it may take other forms, and all such modifications and variations within the scope of the appended claims which will occur to persons skilled in the art are included in the invention.

In the drawings:

Figure 1 is a vertical sectional view of the coupling assembly; and

Figure 2 is a cross sectional view taken on the line 2—2 of Figure 1.

Referring to the drawings, the present coupling is intended to establish driving connection between a drive shaft 10 and a driven shaft 12. Driven shaft 12 may extend vertically into a pump housing or the like and support a pump impeller, for example, on its lower end, not shown. While the present coupling could efficiently be used to connect horizontal shafting, it is described herein as having novel structure to connect vertical shafting wherein the driven shaft 12 is suspended from the drive shaft 10. A typical pump installation is illustrated in Figure 1 of application Serial No. 354,484, filed May 12, 1953, entitled Self-Priming Pumping System. The present coupling is designed to take the place of conventional coupling 22 in said application.

Drive shaft 10 has a peripheral groove 13 adjacent its lower end in which is seated a thrust washer 14. A collar 15 having an annular flange 16 is keyed to the shaft 10 by key 17 and has an annular recess 18 to receive the thrust washer 14 whereby collar 15 will support a downward thrust load imposed thereon. Driven shaft 12 has a threaded end portion 22 provided with a longitudinal slot 23. A collar 24 is keyed to shaft 12 by a key 25 and has a series of radial bores 26 in its peripheral surface.

A driving connection between the two collars 15 and 24 is accomplished by a sleeve 30. Sleeve 30 is connected to the collar 15 by a plurality of cap screws 32 and is connected to the collar 24 by a plurality of radial shear pins 33 mounted in bores 34 in the sleeve and aligned bores 26 in the collar 24. Shear pins 33 are grooved annularly at 35 so as to be transversely weakened at a point between the collar 24 and sleeve 30 whereby, upon an excessive strain or overload on the driven shaft such as would be caused by blockage of the pump unit, the pins are sheared at their weakened points to permit the sleeve 30 and drive shaft 10 to continue to spin while the driven shaft remains stationary.

As seen in Figure 1, a vertical space or passageway 36 is provided between the outer and inner peripheral surfaces of the collar 24 and sleeve 30, respectively, so that, when the pins are sheared due to an overload on the driven shaft, the fractured portions of the pins will not engage any adjacent structure except possibly parts of the pins themselves. Furthermore, set screws 37 are threaded in the end of sleeve 30 and engage the outer ends of shear pins 33 to hold the outer portions of the pins in the sleeve after a shearing action, since the outer ends of the shear pins would still be subject to centrifugal force. To reestablish a driving connection between the parts after an overload which has sheared the pins, the set screws 37 are withdrawn slightly to remove the pin parts and new pins are inserted and secured in place by screws 37.

Sleeve 30 has an inturned flange 40 forming a shoulder portion 41 interiorly of the sleeve, and is provided with a threaded pipe connection 42. Bores 43 and 44 are provided in the sleeve and establish communication between the pipe connection 42 and the interior of the sleeve. Seated on the shoulder 41 is a thrust bearing ring 48 having a central recess 49 and an annular groove 50 on its peripheral edge. The ring 48 also is provided with an annular groove 51 in its bottom surface which communicates with bore 44 in the sleeve and one or more bores 52 provided in the ring 48 and opening into recess 49.

Threaded on the end 22 of shaft 12 is a nut 55 secured to the thrust bearing ring 48 by screws 56. Nut 55 is grooved on its bottom surface to provide a pair of flanges 57 and 58, the flange 57 fitting in groove 50 of the bearing ring 48 and the flange 58 engaging the bottom of recess 49. By means of the pipe connection 42, bores 43 and 44, groove 51, and bores 52, a lubricant is admitted into recess 49 in the bearing ring 48 and confined therein by the flanges 57 and 58 of the nut. Pipe connection 42 is then closed by plug 42a.

Nut 55 is castellated and has a locking pin 62 secured in place under a cap screw 63. The locking pin 62 engages slot 23 in the shaft 12 and holds the nut against rotation on the shaft. Vertical adjustment of the driven shaft 12 is possible by removing the collar 15 from the sleeve 30 and then releasing locking pin 62 whereby the nut 55 can be turned on the threads 22, depending upon the upward or downward adjustment desired for the driven shaft 12.

In operative relation the entire thrust load of the coupling and driven shaft assembly is supported by thrust washer 18 on the drive shaft, and the thrust load of the driven shaft assembly is in turn supported by the shoulder 41 in the sleeve 30. The nut 55 bears on thrust bearing ring 48 seated on shoulder 41 and the whole coupling assembly turns as a unit under normal load operation. Upon an excessive torque load being placed upon the driven shaft 12, the shear pins 33 will break to disconnect the motor from the load, whereby the shaft 10 and sleeve 30 will be permitted to rotate freely relative to the driven shaft 12 and its collar 24, nut 55 and thrust bearing ring 48. Collar 24 is free to slide down on the shaft 12 after the pins 33 have been sheared, and a pin 65 is thus mounted in the shaft to form a stop therefor.

During normal operation of the assembly, recess 49 in the thrust ring 48 contains a lubricant inserted therein through the pipe connection 42, communicating bores 43 and 44, grooves 51, and bores 52, and this lubricant is confined in the recess 49 and its communicating bores and grooves as hereinabove described. When the shear pins 33 are broken, the sleeve 30 will rotate relative to ring 48 and the engaging surfaces are lubricated by the confined lubricant. Bearing surface 41 supports the entire thrust load of the shaft 12 and lubrication between the stationary and rotating parts after failure of the shear pins permits free rotation and prevents damage to the engaging parts until the pump blockage or other fault is discovered and the driving motor shut off. The low friction operation of the thrust bearing permits the driving motor to continue to run without danger of overload or stalling.

Sleeve 30 forms a protective housing around bearing surface 41 and bearing ring 48 to exclude gritty material which would be injurious to the bearing surfaces. Any wear in the thrust bearing elements is readily compensated by adjustment of nut 55.

Having now described my invention and in what manner the same may be used, what I claim as new and desire to protect by Letters Patent is:

1. In a coupling for establishing connection between a vertical drive shaft and an axially aligned driven shaft, a collar on each of said shafts, a sleeve secured to said drive shaft collar and connected to said other collar by shear pins whereby in normal operation said shafts will rotate as a unit but said driven shaft will be disconnected upon overload breakage of said shear pins, means in said sleeve defining a thrust bearing surface, an adjustable nut on said driven shaft interiorly of said sleeve, a thrust bearing on said nut engageable with said thrust bearing surface whereby adjustment of said nut provides for axial movement of said driven shaft relative to said drive shaft, and means in said sleeve for admitting a lubricant to said thrust bearing surface.

2. A shear type vertical shaft coupling for suspending a driven shaft from a drive shaft comprising coupling collars keyed on the responsive shafts, a thrust abutment on said drive shaft supporting said drive shaft collar, a coupling member connected with said drive shaft collar, shear pins in said member engaging the coupling collar on the driven shaft, a thrust bearing element on said member, a nut on said driven shaft forming an axially adjustable thrust bearing element for supporting said driven shaft on said coupling member, and means for locking said nut in adjusted position on said driven shaft.

3. A shear type vertical shaft coupling for suspending a driven shaft from a drive shaft, comprising a thrust abutment on said drive shaft, a collar keyed to said drive shaft and supported on said thrust abutment, a sleeve on said collar, a thrust bearing on said sleeve, an adjustable nut on said driven shaft having a thrust bearing supported on said sleeve thrust bearing, means for locking said nut in adjusted position on said driven shaft, a collar keyed on said driven shaft, and shear pins interconnecting said sleeve and driven shaft collar.

4. A shear type vertical shaft coupling for suspending a driven shaft from a drive shaft, comprising a thrust abutment on said drive shaft, a collar keyed to said drive shaft and supported on said thrust abutment, a coupling member on said collar, a thrust bearing on said coupling member, a thrust bearing on said driven shaft engaging said first thrust bearing to support said drive shaft, means for axially adjusting one of said thrust bearings, means for locking said means in adjusted position, a collar keyed on said driven shaft, and shear pins interconnecting said coupling member and driven shaft collar.

5. A shear type vertical shaft coupling for suspending a driven shaft from a drive shaft, comprising a thrust abutment on said drive shaft, a collar keyed to said drive shaft and supported on said thrust abutment, a coupling member on said collar, a thrust bearing on said coupling member, a thrust bearing on said driven shaft engaging said first thrust bearing to support said driven shaft, means for axially adjusting one of said thrust bearings, means for locking said means in adjusted position, a collar keyed on said driven shaft below said thrust bearings, a portion of said coupling member surrounding said driven shaft collar, and radial shear pins interconnecting said coupling member and driven shaft collar.

6. A shear type vertical shaft coupling for suspending a driven shaft from a drive shaft, comprising a thrust abutment on said drive shaft, a collar keyed to said drive shaft and supported on said thrust abutment, a depending sleeve detachably connected to said collar, an annular thrust bearing on said sleeve, an axially adjustable thrust bearing on said driven shaft supporting said driven shaft on said sleeve thrust bearing, an axially slidable collar keyed on said driven shaft below said bearings, said sleeve having a lower end surrounding said driven shaft collar, and radial shear pins interconnecting said lower end of said sleeve and said driven shaft collar.

7. A shear type vertical shaft coupling for suspending a driven shaft from a drive shaft, comprising a thrust abutment on said drive shaft, a collar keyed to said drive shaft and supported on said thrust abutment, a depending sleeve detachably connected to said collar, an annular thrust bearing in said sleeve surrounding said driven shaft, an adjustable nut on the end of said driven shaft, a thrust bearing ring on the underside of said nut supported by said sleeve thrust bearing and having an annular grease retaining recess on its upper side adjacent said nut, a lubrication duct in said sleeve communicating through said sleeve thrust bearing and said bearing ring with said recess, a collar secured to said driven shaft below said bearings against relative rotation, and shear pins interconnecting said sleeve and driven shaft collar.

8. A shear type vertical shaft coupling for suspending a driven shaft from a drive shaft, comprising a sleeve secured to one of said shafts and forming a bearing housing, a thrust bearing assembly enclosed in said housing for supporting said driven shaft, a collar keyed to the other shaft outside said housing in cooperative relation with one end of said sleeve, and shear pins interconnecting said sleeve and collar.

9. An axially adjustable shear type vertical shaft coupling for suspending a driven shaft from a drive shaft with the driven shaft in adjusted vertical position relative to the drive shaft, comprising a rotatable thrust bearing connection between the two shafts and an axially slidable torque connection between the two shafts, said thrust connection comprising a nut threaded on one of the shafts and means to lock said nut in adjusted position, and said torque connection comprising a collar keyed to one of the shafts and shear pins in said collar operatively connected to the other shaft, said collar being axially slidable on its shaft to accommodate axial adjustment of said thrust connection.

References Cited in the file of this patent
UNITED STATES PATENTS

| | | |
|---|---|---|
| 1,637,944 | Keller | Aug. 2, 1927 |
| 1,923,132 | Witkin | Aug. 22, 1933 |